United States Patent
Wentink

(10) Patent No.: US 8,594,007 B2
(45) Date of Patent: Nov. 26, 2013

(54) SEQUENTIAL ACK FOR MULTI-USER TRANSMISSIONS

(75) Inventor: Maarten Menzo Wentink, Naardewn (NL)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 13/090,158

(22) Filed: Apr. 19, 2011

(65) Prior Publication Data

US 2011/0261742 A1 Oct. 27, 2011

Related U.S. Application Data

(60) Provisional application No. 61/327,575, filed on Apr. 23, 2010.

(51) Int. Cl.
*H04H 20/71* (2008.01)

(52) U.S. Cl.
USPC ............................................ 370/312

(58) Field of Classification Search
USPC .......... 370/312, 328, 329, 335; 455/509, 450
See application file for complete search history.

(56) References Cited

U.S. PATENT DOCUMENTS

| | | | |
|---|---|---|---|
| 2007/0153760 A1 | 7/2007 | Shapira | |
| 2007/0189207 A1* | 8/2007 | Sammour et al. | 370/328 |
| 2007/0286226 A1 | 12/2007 | Yoon et al. | |
| 2009/0279470 A1* | 11/2009 | Seok | 370/312 |
| 2010/0220654 A1 | 9/2010 | Wentink | |
| 2010/0311432 A1* | 12/2010 | Lauer et al. | 455/450 |
| 2011/0002309 A1 | 1/2011 | Park et al. | |

OTHER PUBLICATIONS

International Search Report and Written Opinion—PCT/US2011/033674, ISA/EPO—Jul. 21, 2011.
Ahuja, R. et al. (Oct. 2007. "Combined ACK/NACK based approach to multicast at the link layer." Motorola, pp. 1-4, IP.com: IPCOM000159853D.

* cited by examiner

*Primary Examiner* — Chi Pham
*Assistant Examiner* — Fahmida Chowdhury
(74) *Attorney, Agent, or Firm* — John J. Ketchum

(57) ABSTRACT

Techniques are provided for sending an acknowledgment from a station to an access point in response to a multi-user transmission, which may include receiving a multi-user transmission addressed to a multi-user group including the station, determining a response position of the station in a sequence of responses based on an order of the station in the group, and sending the acknowledgment in the determined response position. Techniques are also provided for ordering acknowledgments from a group of stations addressed in a multi-user transmission from an access point, which may include selecting a group identifier to identify the group of stations to receive the multi-user transmission, configuring a header portion of the multi-user transmission to indicate a Sequential ACK acknowledgment policy for station responses based on an order of the stations in the group, and transmitting the multi-user transmission to the group.

32 Claims, 7 Drawing Sheets

US 8,594,007 B2

SEQUENTIAL ACK FOR MULTI-USER TRANSMISSIONS

CLAIM OF PRIORITY UNDER 35 U.S.C. §119

The present Application for Patent claims priority to Provisional Application No. 61/327,575 entitled "SEQUENTIAL ACK FOR MULTI-USER TRANSMISSIONS" filed Apr. 23, 2010, and assigned to the assignee hereof and hereby expressly incorporated by reference herein.

FIELD OF DISCLOSURE

The present disclosure generally relates to acknowledgements from several stations in wireless local area network systems. More particularly, the disclosure relates to acknowledgements from a set of stations that have been addressed as part of a multi-user transmission.

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input and Multiple Output (MIMO) technology represents one such approach that has recently emerged as a popular technique for next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, Medium Access Control (MAC) protocols are designed to exploit several dimensions of freedom offered by the air link medium. The most commonly exploited dimensions of freedom are time and frequency. For example, in the IEEE 802.11 MAC protocol, the "time" dimension of freedom is exploited through the Carrier Sense Multiple Access (CSMA) protocol. The CSMA protocol attempts to ensure that no more than one transmission occurs during a period of potential high interference. Similarly, the "frequency" dimension of freedom may be exploited by using different frequency channels.

Recent developments have led to the space dimension being a viable option for increasing, or at least more efficiently using, existing capacity. Spatial Division Multiple Access (SDMA) may be used for improving the utilization of the air link by scheduling multiple terminals for simultaneous transmission and reception. In SDMA, data is sent to each of the terminals using spatial streams. A transmitter may form orthogonal streams to individual receivers such that a stream targeted at a given station STA-A, for example, is seen as low power interference at STA-B, STA-C, etc., which will not cause significant interference and most likely be ignored. Such orthogonal streams can be formed because the transmitter has several antennas and the transmit/receive channel includes several paths. Receivers may also employ MIMO technology.

Additional complexities arise when MIMO is applied to Multi-User (MU) systems, however. For example, one problem that arises is how to efficiently organize response Transmit Opportunities (TXOPs) from several receivers. The receivers may have received downlink data in parallel from a Multi-User transmission (MU transmission), after which they may need to respond with a Block Acknowledgment (BA) frame or the like, possibly along with other uplink traffic. Conventional systems have relied on providing the addressed stations with a specified time slot after the downlink transmission, but this approach has several drawbacks. For example, the transmitting Access Point (AP) does not know the optimal length of the slot, because the uplink rate and the amount of data are not known to the AP. The rate could be specified by the AP, but this would typically result in too conservative of an estimate, and therefore too long response slots. Further, when the time slot information is not received by the STA, the time slot is wasted.

SUMMARY

Exemplary embodiments of the invention are therefore directed to systems and methods for improved ordering of acknowledgment messages for multi-user transmissions addressing a group of stations.

In accordance with one or more embodiments, a method for sending an acknowledgment from a station to an access point in response to a multi-user transmission may include receiving a multi-user transmission addressed to a multi-user group including the station, determining a response position of the station in a sequence of responses based on an order of the station in the group, and sending the acknowledgment in the determined response position.

In accordance with other embodiments, a method for ordering acknowledgments from a group of stations addressed in a multi-user transmission from an access point may include selecting a group identifier to identify the group of stations to receive the multi-user transmission, configuring a header portion of the multi-user transmission to indicate a Sequential ACK acknowledgment policy for station responses based on an order of the stations in the group, and transmitting the multi-user transmission to the group.

In accordance with still other embodiments, an apparatus for sending an acknowledgment from a station to an access point in response to a multi-user transmission may include a receiver configured to receive a multi-user transmission addressed to a multi-user group including the station, a controller configured to determine a response position of the station in a sequence of responses based on an order of the station in the group, and a transmitter configured to send the acknowledgment in the determined response position.

In accordance with still other embodiments, an apparatus for ordering acknowledgments from a group of stations addressed in a multi-user transmission from an access point may include a controller configured to select a group identifier to identify the group of stations to receive the multi-user transmission and to configure a header portion of the multi-user transmission to indicate a Sequential ACK acknowledgment policy for station responses based on an order of the stations in the group. The apparatus may further include a transmitter configured to transmit the multi-user transmission to the group.

In accordance with still other embodiments, an apparatus for sending an acknowledgment from a station to an access point in response to a multi-user transmission may include means for receiving a multi-user transmission addressed to a multi-user group including the station, means for determining a response position of the station in a sequence of responses based on an order of the station in the group, and means for sending the acknowledgment in the determined response position.

In accordance with still other embodiments, an apparatus for ordering acknowledgments from a group of stations addressed in a multi-user transmission from an access point may include means for selecting a group identifier to identify the group of stations to receive the multi-user transmission, means for configuring a header portion of the multi-user transmission to indicate a Sequential ACK acknowledgment policy for station responses based on an order of the stations in the group, and means for transmitting the multi-user transmission to the group.

In accordance with still other embodiments, a non-transitory computer-readable medium comprising code, which, when executed by a machine, causes the machine to perform operations for sending an acknowledgment from a station to an access point in response to a multi-user transmission, may include code for receiving a multi-user transmission addressed to a multi-user group including the station, code for determining a response position of the station in a sequence of responses based on an order of the station in the group, and code for sending the acknowledgment in the determined response position.

In accordance with still other embodiments, a non-transitory computer-readable medium comprising code, which, when executed by a machine, causes the machine to perform operations for ordering acknowledgments from a group of stations addressed in a multi-user transmission from an access point, may include code for selecting a group identifier to identify the group of stations to receive the multi-user transmission, code for configuring a header portion of the multi-user transmission to indicate a Sequential ACK acknowledgment policy for station responses based on an order of the stations in the group, and code for transmitting the multi-user transmission to the group.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
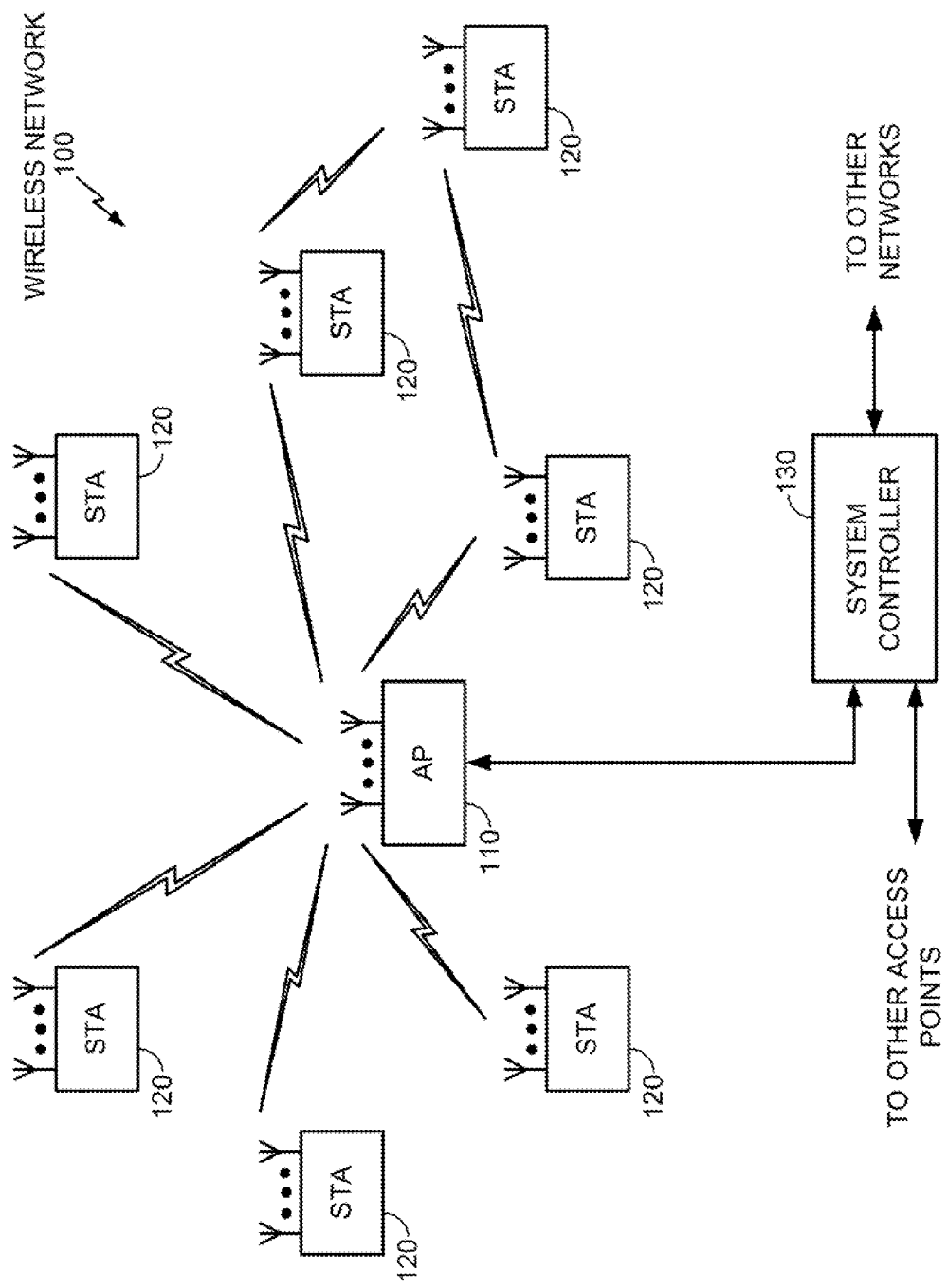
FIG. 1 shows a spatial division multiple access MIMO wireless network in accordance with certain embodiments of the present disclosure.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. In the detailed description that follows, the term "access point" may be used to designate a transmitting node and the term "access terminal" may be used to designate a receiving node for downlink communications, whereas the term "access point" may be used to designate a receiving node and the term "access terminal" may be used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal, a mobile station, a subscriber station, a station, a wireless device, a terminal, a node, a wireless node or some other suitable terminology. The various concepts described throughout this disclosure are intended to apply to all suitable wireless nodes regardless of their specific nomenclature.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Several aspects of a wireless network will now be presented with reference to FIG. 1, which illustrates a Spatial Division Multiple Access (SDMA) Multiple Input and Multiple Output (MIMO) wireless network in accordance with certain embodiments of the present disclosure. SDMA may also be referred to as Multi-User Multiple Input Multiple Output (MU-MIMO). While certain techniques are described herein with reference to SDMA, those skilled in the art will recognize that the techniques may be generally applied in systems utilizing any type of multiple access schemes, such as SDMA, OFDMA, CDMA, and combinations thereof.

The wireless network 100, which may also referred to herein as a basic service set (BSS), is shown with several wireless nodes, generally designated as an access point (AP) 110 and a plurality of access terminals or stations (STAs) 120. Each wireless node is generally capable of receiving and/or transmitting.

The wireless network 100 may support any number of APs 110 distributed throughout a geographic region to provide coverage for STAs 120. A system controller 130 may be used to provide coordination and control of the APs 110, as well as access to other networks (e.g., Internet) for the STAs 120. For simplicity, one AP 110 is shown in FIG. 1. The AP 110 is generally a fixed terminal that provides backhaul services to the STAs 120 in its geographic region of coverage. However, the AP 110 may be mobile in some applications. The STAs 120, which may be fixed or mobile, utilize the backhaul services of the AP 110 or engage in peer-to-peer communications with other STAs 120. Examples of STAs 120 include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, the AP 110 may communicate with multiple STAs 120 simultaneously using SDMA. SDMA is a multiple access scheme which enables multiple streams transmitted to different receivers at the same time to share the same frequency channel, and, as a result, provide higher user capacity. This is achieved by spatially precoding each data stream and then transmitting each spatially precoded stream through a different transmit antenna on the downlink. The spatially precoded data streams arrive at the STAs 120 with different spatial signatures, which enables each STA 120 to recover the data stream destined for that STA 120. On the uplink, each STA 120 transmits a spatially precoded data stream, which enables the AP 110 to identify the source of each spatially precoded data stream. It should be noted that although the term "precoding" is used herein, in general, the term "coding" may also be used to encompass the process of precoding, encoding, decoding and/or postcoding a data stream.

One or more STAs 120 may be equipped with multiple antennas to enable certain functionality. With this configuration, for example, multiple antennas at the AP 110 may be used to communicate with the multiple antennas of the STAs 120 to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe STAs 120 that also support MIMO technology, the AP 110 may also be configured to support STAs that do not support MIMO technology. This approach may allow older versions of access terminals (i.e., "legacy" terminals) to remain deployed in a wireless network, extending their useful lifetime, while allowing newer MIMO access terminals to be introduced as appropriate. As used herein, the term "legacy" generally refers to wireless network nodes that support 802.11n or earlier versions of the Institute of Electrical Engineers (IEEE) 802.11 standard.

Figure 2:
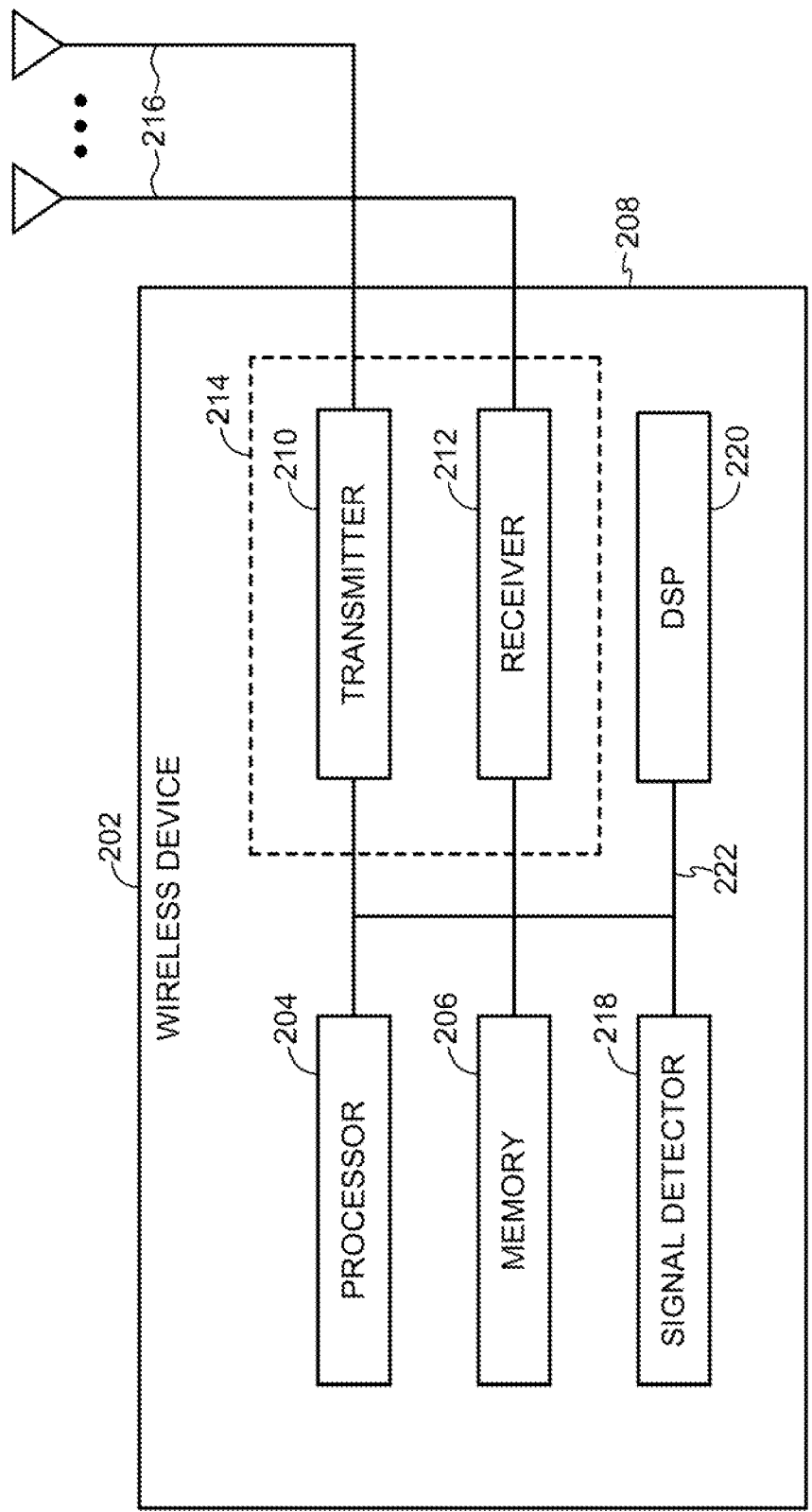
FIG. 2 illustrates example components of a wireless device in accordance with certain embodiments of the present disclosure.

FIG. 2 illustrates various components that may be utilized in a wireless device 202 that may be employed within the system 100. The wireless device 202 is an example of a device that may be configured to implement the various techniques described herein. The wireless device 202 may be an AP 110 or an STA 120.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the techniques described herein. The processor 204 and memory 206 may be collectively referred to simply as a controller.

The wireless device 202 may also include a housing 208 to house a transmitter 210 and a receiver 212 for transmission and reception of data between the wireless device 202 and a remote location. The transmitter 210 and receiver 212 may be combined into a transceiver 214. A plurality of antennas 216 may be attached to the housing 208 and electrically coupled to the transceiver 214. The wireless device 202 may include multiple transmitters, multiple receivers, and multiple transceivers, although not illustrated explicitly.

The wireless device 202 may also include a signal detector 218 that may be used in an effort to detect and quantify the level of signals received by the transceiver 214. The signal detector 218 may detect total energy, energy per subcarrier per symbol, power spectral density and/or other characteristics of the signals. The wireless device 202 may also include a digital signal processor (DSP) 220 for use in processing signals.

The various components of the wireless device 202 may be coupled together by a system bus 222, which may include a power bus, a control signal bus, and a status signal bus in addition to a data bus.

The wireless network 100 shown in FIG. 1 may be an 802.11 Wireless Local

Area Network (WLAN) system, for example. New IEEE 802.11 WLAN standards such as 802.11ac are proposed to allow parallel transmissions from an AP (e.g., the AP 110) to several of STAs (e.g., some or all of the STAs 120) at once. Such transmissions are generally referred to as Multi-User (MU) transmissions, as opposed to the existing Single-User (SU) transmissions. As discussed above, MU transmissions may for example use MU-MIMO, also referred to as SDMA. In MU-MIMO, the AP sends data to each STA using different spatial streams. However, one problem that arises in MU-MIMO transmissions is how to efficiently organize response Transmit Opportunities (TXOPs) from several of the STAs. The STAs may have received downlink data in parallel through SDMA or OFDMA, after which they may need to respond with a Block Acknowledgment (BA) frame or the like, possibly along with other uplink traffic. A complicating issue that arises when using MU transmissions is how the STAs should determine their respective response positions, also referred to as "response locations" or simply "locations," in a sequence of response frame acknowledgments to the AP.

Conventional systems have relied on providing the addressed STAs with a specified time slot after the downlink transmission on which to transmit an acknowledgment response. For example, one approach is to provide the addressed STAs with a deterministic backoff, such as through a Deterministic Slot Count (DSC) field embedded in the downlink transmission. Each addressed STA is assigned an individual backoff count through a downlink SDMA Aggregated Media Access Control (MAC) Protocol Data Unit (A-MPDU) sent by the AP. The DSC is counted down by the addressed STA after receipt of the downlink transmission containing the DSC field. Each STA sends its response when its particular DSC reaches zero.

However, this conventional approach has several drawbacks. For example, the AP does not know the optimal length of the response slot, because the uplink rate and the amount of data are not known to the AP. The rate could be specified by the AP, but this would typically result in too conservative of an estimate, and therefore too long of response slots. Further, when the time slot information is not received by an STA, then the time slot is wasted.

Accordingly, various embodiments disclosed herein address an improved ordering of acknowledgments for MU transmissions addressing a group of the STAs in a WLAN. In general, the order of each STA inside a predefined group to which the MU transmission is sent, or the particular spatial streams that the STA was assigned for receiving the MU transmission, may be used to determine the order of each STA's response frame in the sequence of response frames sent after the end of the MU transmission.

Figure 3:
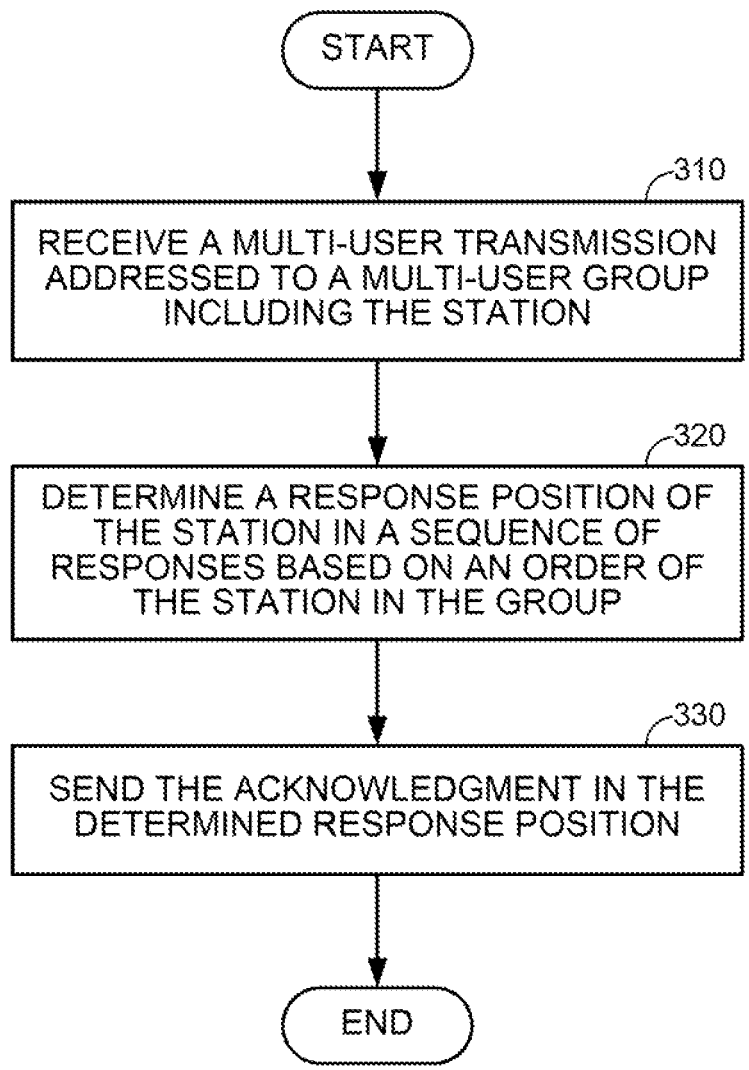
FIG. 3 illustrates an example method for sending an acknowledgment from station to an access point in response to a multi-user transmission according to one or more embodiments.

FIG. 3 illustrates an example method for sending an acknowledgment from a given the STA (e.g., one of STAs 120) to an associated AP (e.g., the AP 110) in response to an MU transmission according to one or more embodiments. As shown, the STA initially receives an MU transmission addressed to an MU group including the STA (block 310). The AP typically assigns the STAs to various groups for receiving various MU transmissions. As discussed above, the group may be an MU-MIMO group and the MU transmission may include an MU Physical Layer Convergence Procedure Protocol Data Unit (MU PPDU). The STA then determines a response position for itself in a sequence of responses based on an order of the STA in the group (block 320), and sends an acknowledgment in its determined response position (block 330).

In some embodiments, the group is specified by a group identifier (Group ID) assigned by the AP. Each group may be associated with a different Group ID. Further, the Group ID may identify group members in a predefined order. For example, the AP may define a Group 1 as (STA1, STA2, STA3, STA4), a Group 2 as (STA2, STA1, STA3, STA4), a Group 3 as (STA5, STA6, STA7), etc. The groups may vary in terms of both membership (e.g., as between Group 1 and Group 3) and member order (e.g., as between Group 1 and Group 2). An STA may be a member of multiple groups such that membership overlaps from group to group (e.g., as with Group 1 and Group 2).

The Group ID may be used by the STAs to determine their location inside a subsequent spatial stream assignment field. For example, an STA may identify at least one spatial stream on which to receive an MU transmission based on the order of the STA in a group associated with the Group ID to which the MU transmission is addressed.

Figure 4:
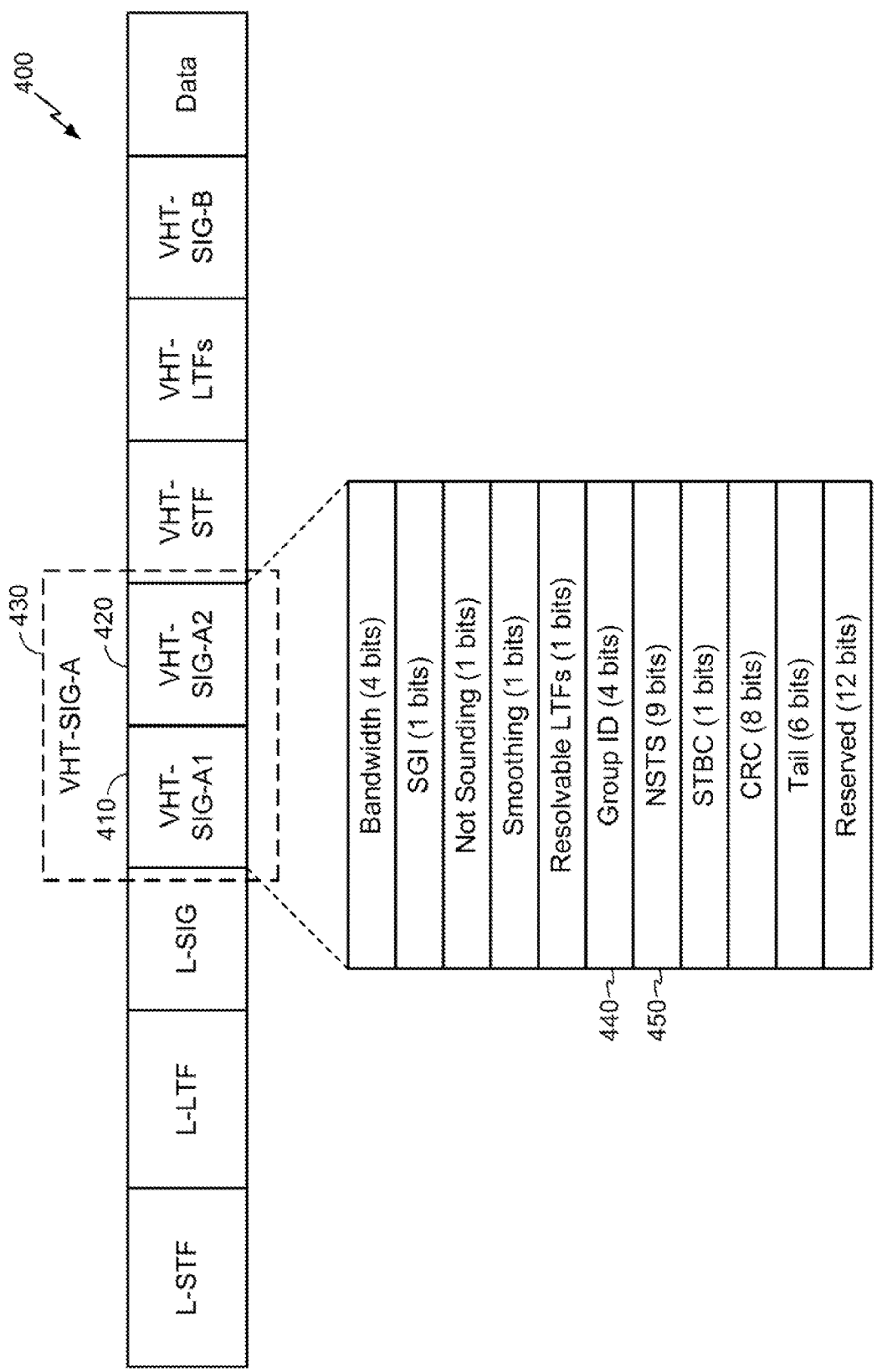
FIG. 4 illustrates an example physical header, such as for 802.11ac, according to one or more embodiments.

The Group ID may be included in a header portion of the MU transmission. FIG. 4 illustrates an example physical (PHY) header 400, such as for 802.11ac, according to one or more embodiments. The PHY header 400 may include a first Very High Throughput Signal field (VHT-SIG-A1) 410 and a second Very High Throughput Signal field (VHT-SIG-A2) 420, which may be referred to collectively as a VHT-SIG-A field 430. A Group ID subfield 440 may be part of the VHT-SIG-A field 430, along with a number of other subfields, as shown.

The Group ID subfield 440 may be used to identify the group of STAs to which an 802.11ac frame is transmitted. Each STA looks at the PHY header 400 to determine if it should continue decoding the transmission or ignore the rest of the transmission. Accordingly, an STA may look at the Group ID, and if the STA is not a member of that particular group, it may ignore the rest of the transmission.

As mentioned above, the Group ID and associated ordering of the STAs within the corresponding group may be used to determine the assignment of spatial streams on which the STAs may listen to receive relevant data contained in the MU transmission. For example, the order STAs occurring in the group associated with the Group ID subfield 440 may determine how the STAs parse the Number of Space Time Streams (NSTS) field 450. The NSTS field 450 specifies the number of spatial streams used to transmit data from an AP to each STA. The spatial stream index typically starts at 0, and STAs pick spatial streams in increasing order according to the number of assigned spatial streams, as specified in the NSTS field 450. For example, returning to the Group 1 defined above as (STA1, STA2, STA3, STA4), when the NSTS field 450 indicates (2, 3, 1, 2), this implies that STA1 is to listen on spatial streams 0 and 1, STA2 is to listen on spatial streams 2, 3 and 4, STA3 is to listen on spatial stream 5, and STA4 is to listen on spatial streams 6 and 7.

The group(s) to which a particular STA belongs may be assigned by the AP at the time the STA registers with the AP, or at some other time. The STAs may also receive a list of one or more Group IDs and the associated STAs from the AP when they register with the AP, when group membership changes (e.g., each time an STA is added to the group), or at some other time. In some embodiments, the AP sends out a management frame containing a list of Group IDs and STAs associated with each Group ID. The ordering within the group may be implicitly defined or explicitly defined. For example, the AP may explicitly order the STAs within a group and communicate this ordering to each STA within the group for each STA to store for future reference.

In this way, the Group ID and ordering of the STAs may be used to determine the assignment of spatial streams on which the STAs listen to receive their data contained in the MU transmission. However, this same group sequence may be further utilized to determine the order in which the response frames are transmitted by the STAs after the end of the MU frame. In 802.11ac, for example, the order of the STA in the MU-MIMO group to which MU PPDUs are sent may be used to determine the position of the individual STA's response frame in a sequence of response frames. Returning to the example groups above, for an MU transmission to Group 1, response frames processed in this manner may be sent in the following order: a response frame from STA1, followed by a response frame from STA2, followed by a response frame from STA3, followed by a response frame from STA4. Similarly, for an MU transmission addressed to Group 2, STA2 sends its response frame after the end of the MU transmission, followed by a response frame from STA1, followed by a response frame from STA3, followed by a response frame from STA4.

Figure 5:
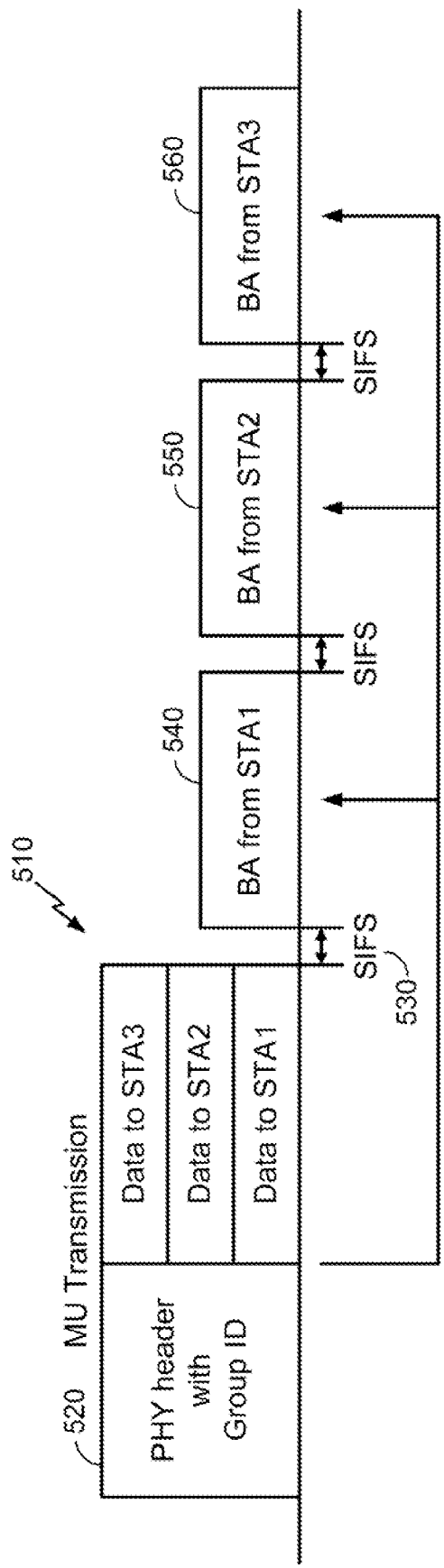
FIG. 5 depicts an example order of response frames from a set of stations determined by the order in which the stations occur in the group to which a multi-user transmission is sent.

The sequence of responses may include responses from a plurality of group members, separated in time by a given frame spacing. FIG. 5 depicts an example order of response frames from a set of STAs determined by the order in which the STAs occur in the group to which an MU transmission is sent. As shown, an MU transmission 510 is sent to a group of STAs 120 defined as (STA1, STA2, STA3) and corresponding to a Group ID identified by a Group ID field, such as Group ID subfield 440 shown in FIG. 4, contained in a PHY header 520 of the MU transmission 510.

Upon receipt of the MU transmission 510, each STA sends an acknowledgment in its determined response position, according to its order in the group. The acknowledgment may include one or more response frames (e.g., Block Acknowledgment frames) that are sent sequentially after the end of the MU transmission 510. The response frames may be spaced apart by a given frame spacing, such as a Short-Interval Frame Spacing (SIFS) time interval 530. Thus, in the example of FIG. 5, STA1 may send its response frame 540 after the end of the MU transmission 510, followed by a response frame 550 from STA2, followed by a response frame 560 from STA3.

The STAs may also base their location in the sequence of response frames on the spatial streams on which they receive data, independent of the way in which the spatial streams are assigned by the AP. Spatial streams may be assigned in sequential order, which simplifies the determination of the order in the sequence.

In general, an acknowledgment policy ("Ack Policy") may be used to designate how the STAs are to acknowledge various transmissions. For example, the Ack Policy of a downlink MPDU transmitted from an AP to certain STAs may be signaled through an Ack Policy subfield of a Quality of Service (QoS) Control field of a Media Access Control (MAC) header of the downlink MPDUs included in an MU PPDU. A Sequential ACK Ack Policy of the type described herein may be achieved in various applications by redefining existing Ack Policies. Sequential ACK may be used in a variety of protocols where a single downlink transmission by the AP is responded to by transmissions from several STAs. In such embodiments, each STA may initially determine whether the Sequential ACK Ack Policy has been designated by the AP for sending acknowledgments. This may be achieved by checking a set of Ack Policy bits in a header portion of the MU transmission, such as bits forming part of the Ack Policy subfield of a QoS Control field.

IEEE 802.11n defines an example conventional Ack Policy subfield in terms of two QoS Control field bits "b5" and "b6," the meaning of which may be modified to implement a revised Sequential ACK Ack Policy for MU transmissions (e.g., for 802.11ac) according to various embodiments. In 802.11n, setting bits b5 and b6 of the QoS Control field to '00' is conventionally used to indicate a "Normal Ack or Implicit Block Ack Request." Setting bits b5 and b6 of the QoS Control field to '01' is used to indicate "No Ack." Setting bits b5 and b6 of the QoS Control field to '10' is used to indicate "No Explicit Acknowledgment or PSMP Ack." Finally, setting bits b5 and b6 of the QoS Control field to '10' is used to indicate a "Block Ack."

The example 802.11n Ack Policy may be modified to implement Sequential ACK for MPDUs inside a MU PDDU as follows. The "Normal Ack or Implicit Block Ack Request Ack Policy" may be redefined to mean Sequential ACK when the MPDU is part of an MU PPDU. MPDUs inside an 802.11ac SU transmission, for example, may use the original definition of the Ack Policy (as if the MPDU was a legacy transmission), or the MPDUs may use Sequential ACK, which in this case simply reduces to a single response. Both interpretations therefore yield the same result, namely that a single response occurs, following a SIFS time period, but when Sequential ACK applies there is an option to change the existing ACK rules.

Accordingly, bits b5 and b6 of the QoS Control field may be set to '00' to indicate that a frame included in an MU PPDU utilizes a Sequential ACK Ack policy and that the order of each STA's response is to be determined by the order in which the STA occurs in the MU group to which the MU PPDU is sent, or by the order of the spatial streams that are assigned to each STA to listen to as part of the MU transmission. It will be appreciated that other bits in a given data frame may be used for other protocols to define a Sequential ACK Ack Policy.

The No Ack Ack Policy, No Explicit Ack Ack Policy, and the Block Ack Ack Policy, which may be used when Polled ACK is employed by the AP to collect the response frames, do not need to be redefined for MU transmissions. Thus, bits b5 and b6 of the QoS Control field may be set to '01' for MPDUs that are transmitted as part of a Power Save Multi-Poll (PSMP) sequence, set to '10' to indicate that no ACK frame is transmitted after the end of the PPDU containing the MPDU (including the frame spacing period), and set to '11' to indicate that no immediate response is sent after the end of the PPDU that contains the MPDU, but that the AP 110 will follow up with a Block Ack Request (BAR) frame to request the transmission of a Block Acknowledgment (BA) frame.

In contrast to conventional systems in which each addressed STA is assigned an individual backoff count through a downlink SDMA Aggregated-MPDU (A-MPDU) sent by the AP, Sequential ACK as described herein may be applied without the need for A-MPDUs. This is because time periods are provided for sending the ACK frames as delayed responses with an equivalent SIFS spacing in between. This may not be the case for polled ACK, because the polling is done through BAR frames (i.e., the BA frame transmission may be requested by sending a BAR frame), but for a normal ACK there is no equivalent of the BAR frame to poll for the transmission of an ACK related to a previously received MPDU.

As discussed above, when a Sequential ACK Ack Policy is used, as signaled by the Ack Policy subfield of the QoS Control field of the MAC header, for example, the order of each BA frame in the response sequence may be determined by the order of the STAs in the group for which the downlink MU packet is destined (e.g., based on the Group ID of the MU PPDU).

Figure 6:
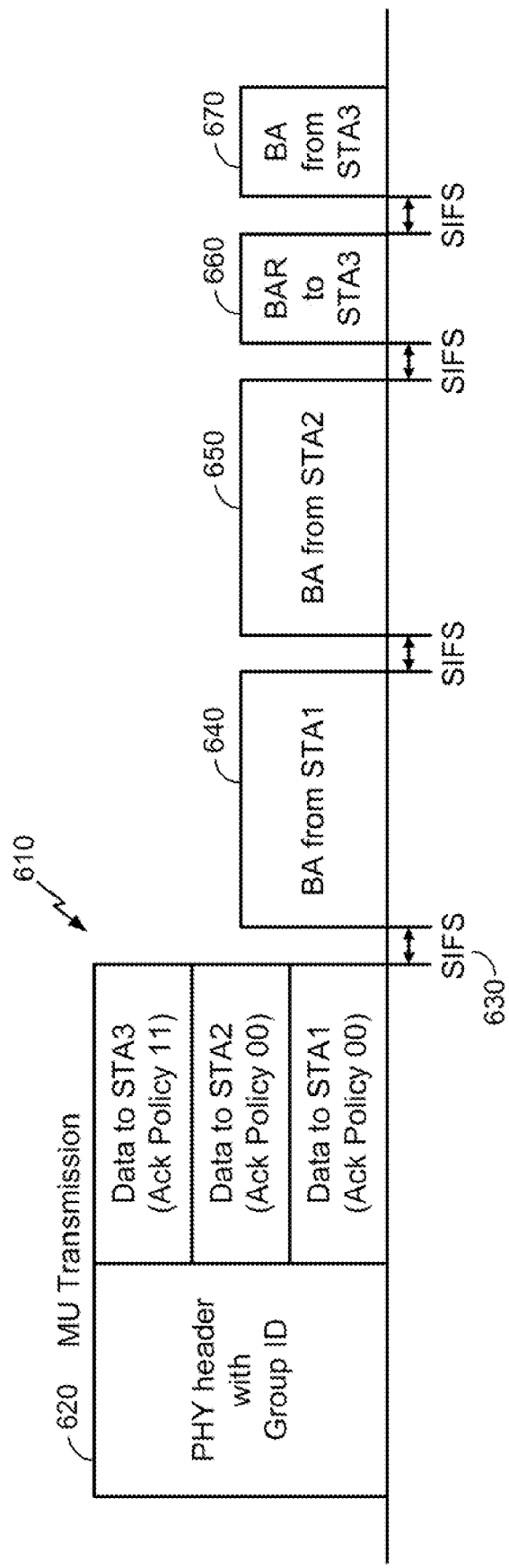
FIG. 6 depicts an example use of an Ack Policy field for a multi-user transmission.

FIG. 6 depicts an example use of an Ack Policy field for an MU transmission 610. As shown, two STAs, STA1 and STA2, each receive an Ack Policy equal to '00' in their respective MAC headers, while a third STA, STA3, receives an Ack Policy equal to '11' in its MAC header. Accordingly, the order of the responses from STA1 and STA2 is determined by their order in the group corresponding to the Group ID, contained in the PHY header 620, for which the downlink MU packet is destined. For example, the group may indicate an order of the STAs as (STA1, STA2, STA3). As shown, STA1 therefore responds with a BA frame 640 at a time increment of SIFS 630 after the end of the MU transmission 610, and then STA2 subsequently responds with a BA frame 650 at a time increment of SIFS 630 after the end of the BA frame 640 from STA1.

Meanwhile, STA3 takes no action upon receipt of the frame except to record its state. STA3 waits for a BAR poll frame 660 from the AP before sending a BA response frame 670. As illustrated here, the Ack Policy may be different for each STA because the MAC header for distinct destinations may be different. Further, in an MU transmission, each STA generally only sees packets that are specifically destined to it.

Figure 7:
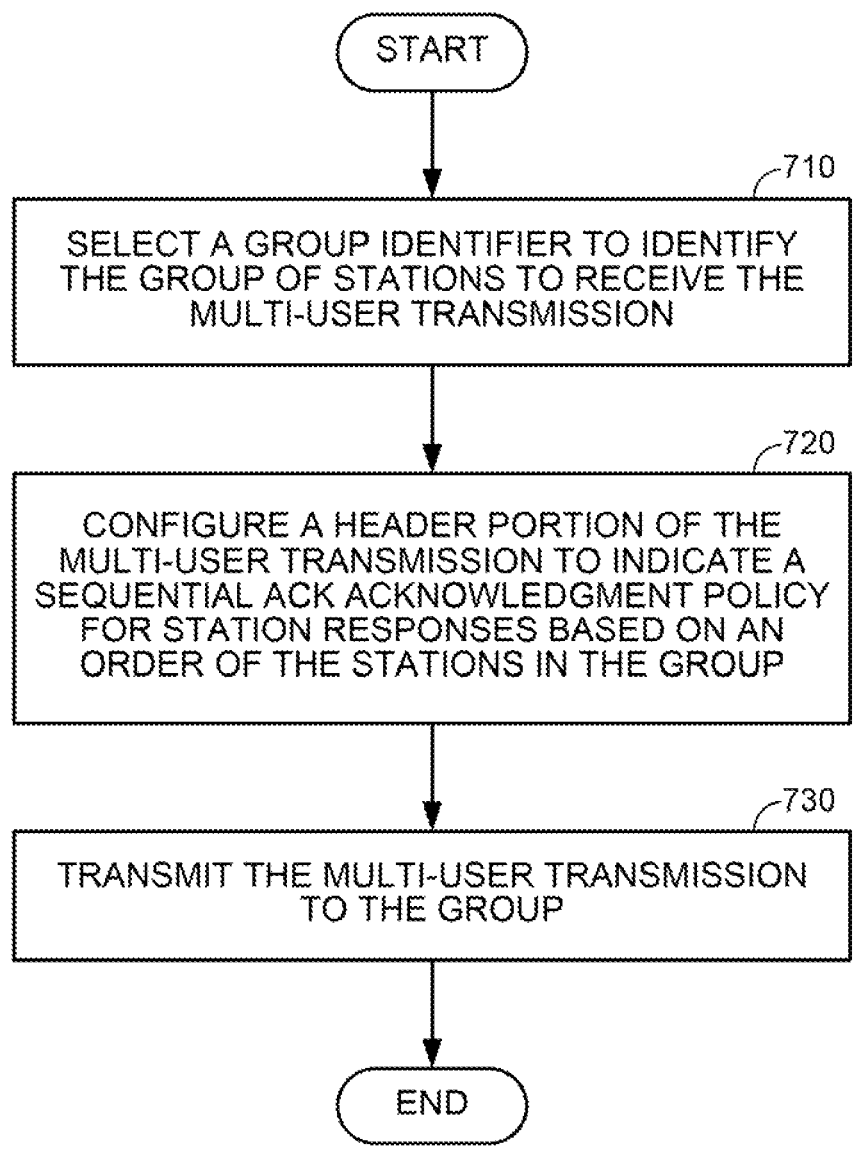
FIG. 7 illustrates an example method for an access point to order acknowledgments from a group of stations addressed in a multi-user transmission according to one or more embodiments.

The particular order of the members in each group, and the resultant response sequence ordering, may be set by the AP as desired. FIG. 7 illustrates an example method for an AP to order acknowledgments from a group of STAs addressed in an MU transmission according to one or more embodiments. As shown, the AP selects a Group ID to identify the group of STAs to receive the MU transmission (block 710). The AP configures a header portion of the MU transmission to indicate that the Sequential ACK Ack Policy for station responses is being utilized, and that the appropriate response position for each STA is based on an order of the stations in the group (block 720). The AP then transmits the MU transmission to the group (block 730). As discussed above, configuring the header portion may include signaling an Ack Policy in an Ack Policy subfield of a QoS Control field (e.g., setting two bits of the Ack Policy subfield of the QoS Control field to '00' to designate the Sequential ACK acknowledgment policy).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for sending an acknowledgment from a station to an access point in response to a multi-user transmission, or for ordering acknowledgments from a group of stations addressed in a multi-user transmission from an access point. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

The invention claimed is:

1. A method for sending an acknowledgment from a station to an access point in response to a multi-user transmission, comprising:
    receiving, in a first message, a list in a predefined order of group members in a multi-user group including the station and a group identifier associated with the multi-user group;
    receiving, in a second message, a multi-user transmission addressed to the multi-user group via the group identifier;
    determining a response position of the station in a sequence of responses based on the predefined order of the station in the multi-user group; and
    sending the acknowledgment in the determined response position.

2. The method of claim 1, wherein the group identifier is assigned by the access point.

3. The method of claim 2, wherein the first message is received from the access point when the station registers with the access point or when group membership changes.

4. The method of claim 1, wherein the group identifier is included in a header portion of the multi-user transmission.

5. The method of claim 1, wherein the sequence of responses comprises responses from a plurality of group members, and wherein the responses are separated in time by a given frame spacing.

6. The method of claim 1, further comprising determining that a Sequential ACK acknowledgment policy has been designated by the access point for sending the acknowledgment.

7. The method of claim 6, wherein determining that the Sequential ACK acknowledgment policy has been designated by the access point comprises checking a set of Ack Policy bits in a header portion of the multi-user transmission.

8. The method of claim 7, wherein the Ack Policy bits are part of an Ack Policy subfield of a Quality of Service Control field.

9. The method of claim 7, wherein the Ack Policy bits comprise two bits set to '00' to designate the Sequential ACK acknowledgment policy.

10. The method of claim 1, further comprising identifying at least one spatial stream on which to receive the multi-user transmission based on the order of the station in the multi-user group.

11. The method of claim 1, wherein the multi-user group is a Multi-User Multiple Input Multiple Output (MU-MIMO)

group and the multi-user transmission comprises a Multi-User Physical Layer Convergence Procedure Protocol Data Unit (MU PPDU).

12. A method for ordering acknowledgments from a group of stations addressed in a multi-user transmission from an access point, comprising:
   transmitting to a station, in a first message, a list in a predefined order of group members in the group including the station and a group identifier associated with the group;
   selecting the group identifier to identify the group of stations to receive the multi-user transmission;
   configuring a header portion of the multi-user transmission to indicate a Sequential ACK acknowledgment policy for station responses based on an order of the stations in the group; and
   transmitting, in a second message, the multi-user transmission to the group.

13. The method of claim 12, wherein configuring the header portion comprises signaling an Ack Policy in an Ack Policy subfield of a Quality of Service Control field.

14. The method of claim 13, wherein signaling the Ack Policy comprises setting two bits of the Ack Policy subfield of the Quality of Service Control field to '00' to designate the Sequential ACK acknowledgment policy.

15. An apparatus for sending an acknowledgment from a station to an access point in response to a multi-user transmission, comprising:
   a receiver configured to receive, in a first message, a list in a predefined order of group members in a multi-user group including the station and a group identifier associated with the multi-user group, and to receive, in a second message, a multi-user transmission addressed to the multi-user group via the group identifier;
   a controller configured to determine a response position of the station in a sequence of responses based on the predefined order of the station in the multi-user group; and
   a transmitter configured to send the acknowledgment in the determined response position.

16. The apparatus of claim 15, wherein the group identifier is assigned by the access point.

17. The apparatus of claim 16, wherein the first message is received from the access point when the station registers with the access point or when group membership changes.

18. The apparatus of claim 15, wherein the controller is further configured to check a set of Ack Policy bits in a header portion of the multi-user transmission to determine that a Sequential ACK acknowledgment policy has been designated by the access point for sending the acknowledgment.

19. The apparatus of claim 18, wherein the Ack Policy bits are part of an Ack Policy subfield of a Quality of Service Control field.

20. The apparatus of claim 15, wherein the controller is further configured to identify at least one spatial stream on which to receive the multi-user transmission based on the order of the station in the multi-user group.

21. An apparatus for ordering acknowledgments from a group of stations addressed in a multi-user transmission from an access point, comprising:
   a transmitter configured to transmit to a station, in a first message, a list in a predefined order of group members in the group including the station and a group identifier associated with the group; and
   a controller configured to select the group identifier to identify the group of stations to receive the multi-user transmission, and to configure a header portion of the multi-user transmission to indicate a Sequential ACK acknowledgment policy for station responses based on an order of the stations in the group,
   wherein the transmitter is further configured to transmit, in a second message, the multi-user transmission to the group.

22. The apparatus of claim 21, wherein the controller is configured to configure the header portion to signal an Ack Policy in an Ack Policy subfield of a Quality of Service Control field.

23. An apparatus for sending an acknowledgment from a station to an access point in response to a multi-user transmission, comprising:
   means for receiving, in a first message, a list in a predefined order of group members in a multi-user group including the station and a group identifier associated with the multi-user group;
   means for receiving, in a second message, a multi-user transmission addressed to the multi-user group via the group identifier;
   means for determining a response position of the station in a sequence of responses based on the predefined order of the station in the multi-user group; and
   means for sending the acknowledgment in the determined response position.

24. The apparatus of claim 23, wherein the group identifier is assigned by the access point.

25. The apparatus of claim 23, wherein the controller is further configured to check a set of Ack Policy bits in a header portion of the multi-user transmission to determine that a Sequential ACK acknowledgment policy has been designated by the access point for sending the acknowledgment.

26. An apparatus for ordering acknowledgments from a group of stations addressed in a multi-user transmission from an access point, comprising:
   means for transmitting to a station, in a first message, a list in a predefined order of group members in the group including the station and a group identifier associated with the group;
   means for selecting the group identifier to identify the group of stations to receive the multi-user transmission;
   means for configuring a header portion of the multi-user transmission to indicate a Sequential ACK acknowledgment policy for station responses based on an order of the stations in the group; and
   means for transmitting, in a second message, the multi-user transmission to the group.

27. The apparatus of claim 26, wherein the means for configuring comprises means for configuring the header portion to signal an Ack Policy in an Ack Policy subfield of a Quality of Service Control field.

28. A non-transitory computer-readable medium comprising code, which, when executed by a machine, causes the machine to perform operations for sending an acknowledgment from a station to an access point in response to a multi-user transmission, the computer-readable medium comprising:
   code for receiving, in a first message, a list in a predefined order of group members in a multi-user group including the station and a group identifier associated with the multi-user group;
   code for receiving, in a second message, a multi-user transmission addressed to the multi-user group via the group identifier;
   code for determining a response position of the station in a sequence of responses based on the predefined order of the station in the multi-user group; and code for sending the acknowledgment in the determined response position.

29. The non-transitory computer-readable medium of claim 28, wherein the group identifier is assigned by the access point.

30. The non-transitory computer-readable medium of claim 28, wherein the controller is further configured to check a set of Ack Policy bits in a header portion of the multi-user transmission to determine that a Sequential ACK acknowledgment policy has been designated by the access point for sending the acknowledgment.

31. A non-transitory computer-readable medium comprising code, which, when executed by a machine, causes the machine to perform operations for ordering acknowledgments from a group of stations addressed in a multi-user transmission from an access point, the computer-readable medium comprising:

code for transmitting to a station, in a first message, a list in a predefined order of group members in the group including the station and a group identifier associated with the group;

code for selecting the group identifier to identify the group of stations to receive the multi-user transmission;

code for configuring a header portion of the multi-user transmission to indicate a Sequential ACK acknowledgment policy for station responses based on an order of the stations in the group; and code for transmitting, in a second message, the multi-user transmission to the group.

32. The non-transitory computer-readable medium of claim 31, wherein the code for configuring comprises code for configuring the header portion to signal an Ack Policy in an Ack Policy subfield of a Quality of Service Control field.

* * * * *